United States Patent
Gao et al.

(10) Patent No.: US 10,623,837 B2
(45) Date of Patent: Apr. 14, 2020

(54) CONNECTION ESTABLISHMENT METHOD AND SYSTEM, AND NODE DEVICE

(71) Applicant: HUAWEI TECHNOLOGIES CO., LTD., Shenzhen (CN)

(72) Inventors: Zhijiang Gao, Shenzhen (CN); Xian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/440,945

(22) Filed: Jun. 13, 2019

(65) Prior Publication Data

US 2019/0306596 A1    Oct. 3, 2019

Related U.S. Application Data

(63) Continuation of application No. PCT/CN2016/109680, filed on Dec. 13, 2016.

(51) Int. Cl.
*H04Q 11/00* (2006.01)
*H04B 10/25* (2013.01)

(52) U.S. Cl.
CPC ......... *H04Q 11/0062* (2013.01); *H04B 10/25* (2013.01); *H04Q 11/00* (2013.01); *H04Q 2011/0077* (2013.01)

(58) Field of Classification Search
CPC .............. H04Q 11/0062; H04Q 11/00; H04Q 2011/0077; H04B 10/25
See application file for complete search history.

(56) References Cited

U.S. PATENT DOCUMENTS

| | | | |
|---|---|---|---|
| 2010/0220999 A1* | 9/2010 | Lee ................. | H04Q 11/0062 398/34 |
| 2013/0236175 A1* | 9/2013 | Sethumadhavan ..... | H04J 14/04 398/55 |

(Continued)

FOREIGN PATENT DOCUMENTS

| | | |
|---|---|---|
| CN | 102439997 A | 5/2012 |
| CN | 103036812 A | 4/2013 |

(Continued)

OTHER PUBLICATIONS

Yao Qiuyan et al: "Crosstalk-Aware Routing, Spectrum, and Core Assignment in Elastic Optical Networks with Multi-Core Fibers", 2016 Asia Communications and Photonics Conference (ACP), OSA, Nov. 2, 2016, pp. 1-3, XP033534449.

(Continued)

*Primary Examiner* — Mina M Shalaby
(74) *Attorney, Agent, or Firm* — Kilpatrick Townsend & Stockton LLP

(57) ABSTRACT

This application provides a node device implementing connection establishment for a Space Division Multiplexing (SDM) network. A first node receives a path (Path) message, which includes a plurality of label objects, each label object includes a field used to indicate a number of an optical core in a multi-core optical fiber, and idle spectrum information of each optical core. The first node then obtains an intersection set of the idle spectrum information of each optical core indicated in the path message and idle spectrum information of a corresponding optical core on a first link. The first node sends, over the first link, a path message that carries an intersection set result, where the first link is a link between the first node and an adjacent node in a direction from the first node to an end node.

16 Claims, 13 Drawing Sheets

Core       Cladding       Sheath

(56) References Cited

U.S. PATENT DOCUMENTS

2015/0222356 A1      8/2015  Kawanishi et al.
2017/0237518 A1*     8/2017  Yang ................... H04J 14/0282
                                                                    398/79
2018/0295588 A1*    10/2018  Abdelmonem ... H04W 28/0236

FOREIGN PATENT DOCUMENTS

| CN | 103457659  A | 12/2013 |
| CN | 104584465  A | 4/2015 |
| EP |   2747309 B1 | 8/2017 |
| WO | 2013033703 A1 | 3/2013 |

OTHER PUBLICATIONS

Berger L et al:"Generalized Multi-Protocol Label Switching (GMPLS) Signaling Functional Description; rfc3471.txt", Jan. 1, 2003, XP015009254, 36 pages.

Fujii Shohei et al:"On-demand spectrum and core allocation for reducing crosstalk in multicore fibers in elastic optical networks", Journal of Optical Communications and Networking, Institute of Electrical and Electronics Engineers, US, vol. 6, No. 12, Dec. 1, 2014, pp. 1059-1071, XP011567941.

N .Amaya et al: "Software defined networking(SDN)over space division multiplexing(SDM) optical networks: features, benefits and experimental demonstration", Optics Express, vol. 22, No. 3, Feb. 10, 2014, XP055630430, 10 pages.

Chatterjee Bijoy Chand et al: "Routingand Spectrum Allocation in Elastic Optical Networks:A Tutorial", IEEE Communicrtions Surveys and Tutorials, VO1 • 17, No. 3, May 11, 2018, pp. 1776-1800, XP011667211.

* cited by examiner

```
   0                   1                   2                   3
 0 1 2 3 4 5 6 7 8 9 0 1 2 3 4 5 6 7 8 9 0 1 2 3 4 5 6 7 8 9 0 1
```

| Grid type | Spectral interval | Identifier field | Spectral interval offset |
|---|---|---|---|
| Spectral width | | Reserved field | |

CONNECTION ESTABLISHMENT METHOD AND SYSTEM, AND NODE DEVICE

CROSS-REFERENCE TO RELATED APPLICATIONS

This application is a continuation of International Application No. PCT/CN2016/109680, filed on Dec. 13, 2016, which is hereby incorporated by reference in its entirety.

TECHNICAL FIELD

This application relates to the field of communications technologies, and in particular, to a connection establishment method and system, and a node device for a Space Division Multiplexing SDM network.

BACKGROUND

With prosperous development of Internet technologies, especially popularization of the mobile Internet, a "connection" gradually becomes a basic resource and requirement of equal importance as air and water in the human society. A social network, the Internet of Things, and a smart city network that rapidly develop directly and technically represent a connection between "persons", a connection between "objects", and a connection between "a person and an object". Based on this, various Internet applications and researches explode, for example, various applications of a mobile terminal, a 4K video, and virtual reality. These applications and technologies bring a high bandwidth requirement, and inevitably impose a higher requirement on a wavelength division network that functions as a pipeline.

The wavelength division network includes nodes and a link. Two nodes are connected to each other by using an optical fiber link, and transmit a signal. In a current wavelength division network, an optical fiber link is usually a single-core optical fiber. To be specific, an optical core (a light-guide fiber) used to transmit data is wrapped in the single-core optical fiber. A structure of the single-core optical fiber is shown in FIG. 1(a). To further improve a communication capability of a single optical fiber, a multi-core optical fiber currently draws increasingly more attention. The multi-core optical fiber is a transmission medium in which a plurality of independent optical cores (light-guide fibers) are wrapped in a single optical fiber. A structure of the multi-core optical fiber is shown in FIG. 1(b). Each core is similar to a single-mode optical fiber, and optical signals in different cores are independently transmitted.

A network that is formed based on the multi-core optical fiber may be referred to as a Space Division Multiplexing (SDM) network. However, an existing connection establishment method does not support the SDM network that is based on the multi-core optical fiber, and consequently a connection cannot be established in the SDM network.

SUMMARY

Embodiments of this application provide a connection establishment method for an SDM network, to resolve a problem that an existing connection establishment method does not support an SDM network that is based on a multi-core optical fiber.

According to a first aspect, a connection establishment method for a Space Division Multiplexing (SDM) network is provided, the SDM network includes a plurality of nodes, the plurality of nodes are connected to each other by using a multi-core optical fiber, and the method includes: receiving, by a first node, a path (Path) message, where the path message includes a plurality of first label objects, each first label object includes a first field used to indicate a number of an optical core in the multi-core optical fiber, and the path message is further used to indicate idle spectrum information of each optical core in the multi-core optical fiber; and obtaining, by the first node, an intersection set of the idle spectrum information, indicated in the path message, of each optical core and idle spectrum information of a corresponding optical core on a first link, and sending, over the first link, a path message that carries an intersection set result, where the first link is a link between the first node and an adjacent node in a direction from the first node to a second node.

The connection establishment method provided in this application can support an SDM network that is based on a multi-core optical fiber, a connection of variable spectrum bandwidth of a node can be automatically established, implementation is simple, and reliability is high. The first node is an intermediate node of the connection.

With reference to the first aspect, in a first possible implementation of the first aspect, the method further includes: receiving, by the first node, an acknowledgement (Resv) message, and establishing a connection based on at least one number of an optical core and selected spectrum information of an optical core with the number that are carried in the Resv message, where the selected spectrum information is selected from an intersection set of idle spectrum information of all optical cores on a preset link between the third node and the second node.

According to a second aspect, a connection establishment method for a Space Division Multiplexing SDM network is provided, the SDM network includes a plurality of nodes, the plurality of nodes are connected to each other by using a multi-core optical fiber, and the method includes: generating, by a third node, a path message, where the path message includes a plurality of first label objects, each first label object includes a first field used to indicate a number of an optical core in the multi-core optical fiber, and the path message is further used to indicate idle spectrum information of each optical core in the multi-core optical fiber; and sending, by the third node, the path message to an adjacent node in a direction from the third node to a second node.

With reference to the second aspect, in a first possible implementation of the second aspect, the method further includes: receiving, by the third node, an acknowledgement (Resv) message, and establishing a connection based on at least one number of an optical core and selected spectrum information of an optical core with the number that are carried in the Resv message, where the selected spectrum information is selected from an intersection set of idle spectrum information of all optical cores on a preset link between the third node and the second node.

The connection establishment method provided in this application can support an SDM network that is based on a multi-core optical fiber, a connection of variable spectrum bandwidth of a node can be automatically established, implementation is simple, and reliability is high. The third node is a source node of the connection.

According to a third aspect, a connection establishment method for a Space Division Multiplexing SDM network is provided, the SDM network includes a plurality of nodes, the plurality of nodes are connected to each other by using a multi-core optical fiber, and the method includes: receiving, by a second node, a path message, where the path message includes a plurality of first label objects, each first label object includes a first field used to indicate a number of an optical core in the multi-core optical fiber, and the path message is further used to indicate idle spectrum information of each optical core in the multi-core optical fiber; obtaining, by the second node, an intersection set of the idle spectrum information, indicated in the path message, of each optical core and idle spectrum information of a corresponding optical core on a first interface of the second node, to obtain idle spectrum information of each optical core on a preset link, where the first interface is a destination interface on the preset link; selecting, by the second node, at least one number of an optical core and selected spectrum information of an optical core with the number based on a spectral width required by a to-be-transmitted service and the idle spectrum information of each optical core on the preset link, and sending, to an adjacent node in a direction from the second node to a first node, an acknowledgement (Resv) message that carries a selection result; and establishing, by the second node, a connection based on the selection result.

The connection establishment method provided in this application can support an SDM network that is based on a multi-core optical fiber, a connection of variable spectrum bandwidth of a node can be automatically established, implementation is simple, and reliability is high. The second node is a sink node of the connection.

According to a fourth aspect, a node device is provided, the node device is used for a Space Division Multiplexing SDM network, different node devices are connected to each other by using a multi-core optical fiber, and the node device includes a first receiving module, a first processing module, and a first sending module; the first receiving module is configured to: receive a path (Path) message, and send the path message to the first processing module, where the path message includes a plurality of first label objects, each first label object includes a first field used to indicate a number of an optical core in the multi-core optical fiber, and the path message is further used to indicate idle spectrum information of each optical core in the multi-core optical fiber; the first processing module is configured to obtain an intersection set of the idle spectrum information, indicated in the path message, of each optical core and idle spectrum information of a corresponding optical core on a first link, where the first link is a link between the node and an adjacent node in a direction from the node to a sink node; and the first sending module is configured to send, over the first link, a path message that carries an intersection set result.

With reference to the fourth aspect, in a first possible implementation of the fourth aspect, the device further includes a first establishment module; the first receiving module is further configured to: receive an acknowledgement (Resv) message, and send the Resv message to the first establishment module; and the first establishment module is configured to establish a connection based on at least one number of an optical core and selected spectrum information of an optical core with the number that are carried in the Resv message, where the selected spectrum information is selected from an intersection set of idle spectrum information of all optical cores on a preset link between a source node and the sink node.

According to a fifth aspect, a node device is provided, the node device is used for a Space Division Multiplexing SDM network, different node devices are connected to each other by using a multi-core optical fiber, and the node device includes a third processing module and a third sending module; the third processing module is configured to: generate a path (Path) message, and send the path message to the third sending module, where the path message includes a plurality of first label objects, each first label object includes a first field used to indicate a number of an optical core in the multi-core optical fiber, and the path message is further used to indicate idle spectrum information of each optical core in the multi-core optical fiber; and the third sending module is configured to send the path message to an adjacent node in a direction from the node to a sink node.

With reference to the fifth aspect, in a first possible implementation of the fifth aspect, the device further includes a third receiving module and a third establishment module; the third receiving module is configured to: receive an acknowledgement(Resv) message, and send the Resv message to the third establishment module; and the third establishment module is configured to establish a connection based on at least one number of an optical core and selected spectrum information of an optical core with the number that are carried in the Resv message, where the selected spectrum information is selected from an intersection set of idle spectrum information of all optical cores on a preset link between a source node and the sink node.

According to a sixth aspect, a node device is provided, the node device is used for a Space Division Multiplexing SDM network, different node devices are connected to each other by using a multi-core optical fiber, and the node device includes a second receiving module, a second processing module, a second sending module, and a second establishment module; the second receiving module is configured to: receive a path (Path) message, and send the path message to the second processing module, where the path message includes a plurality of first label objects, each first label object includes a first field used to indicate a number of an optical core in the multi-core optical fiber, and the path message is further used to indicate idle spectrum information of each optical core in the multi-core optical fiber; the second processing module is configured to obtain an intersection set of the idle spectrum information, indicated in the path message, of each optical core and idle spectrum information of a corresponding optical core on a first interface of the node, to obtain idle spectrum information of each optical core on a preset link, where the first interface is a destination interface on the preset link; and is further configured to: select at least one number of an optical core and selected spectrum information of an optical core with the number based on a spectral width required by a to-be-transmitted service and the idle spectrum information of each optical core on the preset link, and send a selection result to the second sending module and the second establishment module; the second sending module is configured to send, to an adjacent node in a direction from the node to a source node, an acknowledgement (Resv) message that carries the selection result; and the second establishment module is configured to establish a connection based on the selection result.

It should be understood that beneficial effects of the node devices provided in the fourth aspect to the sixth aspect are the same as the beneficial effects in the first aspect to the third aspect. Details are not described herein.

With reference to any one of the first aspect to the sixth aspect, in a possible implementation of any one of the first aspect to the sixth aspect, a quantity of first label objects included in the path message is not less than a quantity of optical cores in the multi-core optical fiber.

With reference to any one of the first aspect to the sixth aspect, in a possible implementation of any one of the first aspect to the sixth aspect, the first label object further includes a grid (Grid) field, when the grid field is a first value, the grid field is used to indicate that a live network is the SDM network, and the first value is a positive integer greater than 3 and less than 8.

With reference to any one of the first aspect to the sixth aspect, in a possible implementation of any one of the first aspect to the sixth aspect, the first label object further includes a reserved field, and a total length of the first field and the reserved field is 16 bits.

According to a seventh aspect, a connection establishment system for a Space Division Multiplexing SDM network is provided. The system includes at least the node device in the fourth aspect and any possible implementation of the fourth aspect, the node device in the fifth aspect and any possible implementation of the fifth aspect, and the node device in the sixth aspect and any possible implementation of the sixth aspect. Different node devices are connected to each other by using a multi-core optical fiber.

According to an eighth aspect, a resource information transmission method is provided, the method is used for a Space Division Multiplexing SDM network, the SDM network includes a plurality of nodes, different nodes are connected to each other by using a multi-core optical fiber, and the method includes: generating, by each node, a plurality of first type-length-values TLVs, where each first TLV includes a switching capability specific information SCSI sub-TLV, the SCSI sub-TLV includes a second field used to indicate a number of an optical core in the multi-core optical fiber, and the second fields included in the SCSI sub-TLVs indicate different numbers of optical cores; and sending, by each node, the plurality of first TLVs. The resource information transmission method in this embodiment may be performed at intervals, or may be performed in another specified manner, to update a spectrum resource of each optical core in the multi-core optical fiber in the SDM network.

With reference to the eighth aspect, in a first possible implementation of the eighth aspect, the first TLV further includes a switching capability SC field. When the SC field is a second value, the SC field is used to indicate that a live network is the SDM network. The second value is different from a value that has been designated for the SC field and that has a specific meaning.

According to a ninth aspect, a resource information transmission method is provided, the method is used for a Space Division Multiplexing SDM network, the SDM network includes a plurality of nodes, different nodes are connected to each other by using a multi-core optical fiber, and the method includes: generating, by each node, a plurality of second TLVs, where each second TLV includes an optical core quantity field, an optical core number field, and an optical core location field, the optical core quantity field is used to indicate a total quantity of optical cores in the multi-core optical fiber in the SDM network, the optical core number field is used to indicate a number of an optical core indicated in the second TLV, and the optical core location field is used to indicate a location of the optical core in the multi-core optical fiber; and sending, by each node, the plurality of second TLVs.

With reference to the ninth aspect, in a first possible implementation of the ninth aspect, the second TLV further includes an SDM type field. The SDM type field is used to indicate a frequency band division type of a live network.

According to a tenth aspect, a computer readable storage medium is provided. The computer readable storage medium stores a computer execution instruction. When at least one processor of a device executes the computer execution instruction, the device performs the connection establishment method provided in the first aspect to the third aspect or any possible implementation of the first aspect to the third aspect.

According to an eleventh aspect, a computer program product is provided. The computer program product includes a computer execution instruction, and the computer execution instruction is stored in a computer readable storage medium. At least one processor of a device may read the computer execution instruction from the computer readable storage medium, and when the at least one processor executes the computer execution instruction, the device performs the connection establishment method provided in the first aspect to the third aspect or any possible implementation of the first aspect to the third aspect.

In the solutions provided in the embodiments of this application, an SDM network based on a multi-core optical fiber can be supported, a connection of variable spectrum bandwidth of a node can be automatically established, implementation is simple, and reliability is high.

DESCRIPTION OF EMBODIMENTS

The following describes the technical solutions in various embodiments with reference to the accompanying drawings in the embodiments of this application.

Figure 1A:
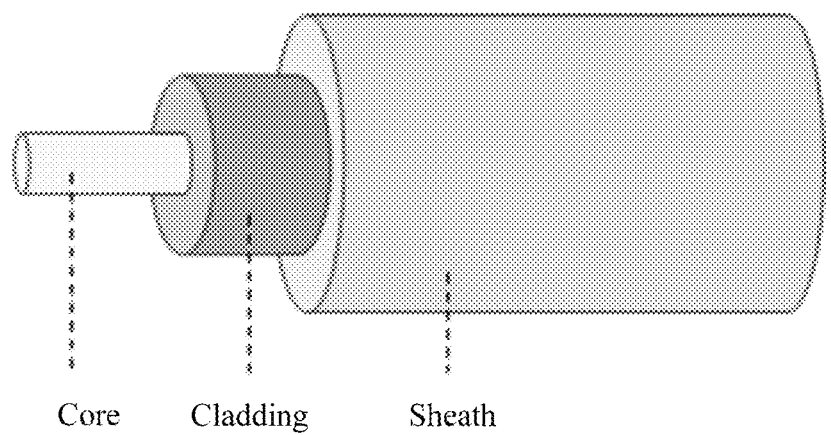
FIG. 1(a) is a structural diagram of a single-core optical fiber.
Figure 1B:
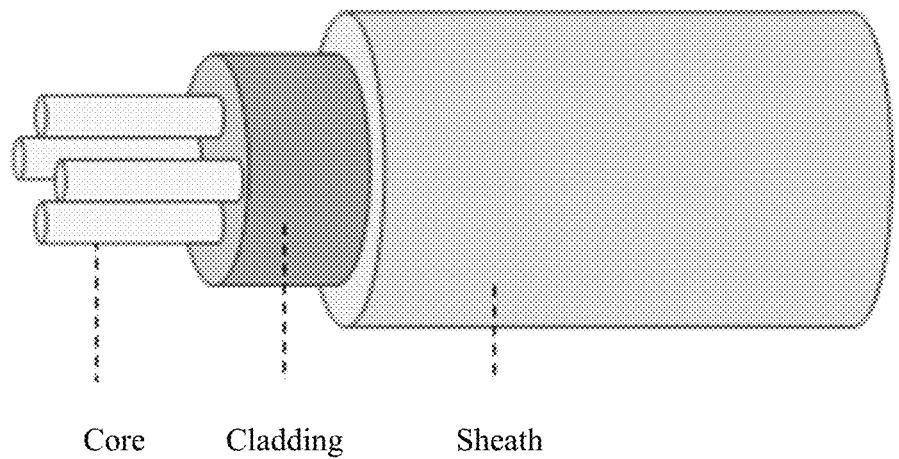
FIG. 1(b) is a structural diagram of a multi-core optical fiber.
Figure 2:
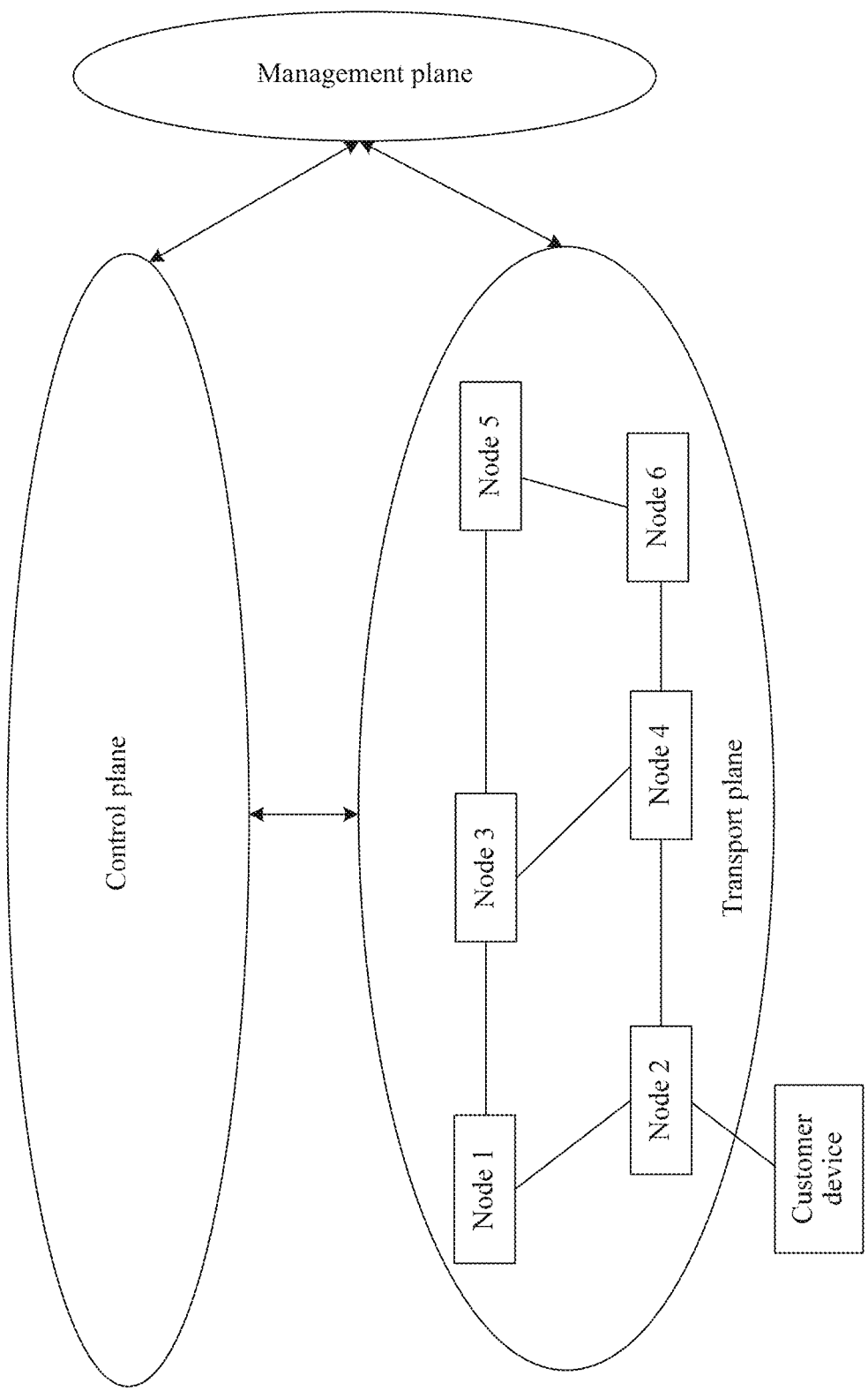
FIG. 2 is a schematic diagram of an ASON network architecture in the prior art.

Embodiments can provide an automatically switched optical network (ASON) that includes a control plane. As shown in FIG. 2, an ASON network architecture includes a management plane, a control plane, and a transport plane. The transport plane includes a series of transport entities, for example, nodes and traffic engineering (TE) links between the nodes. The transport plane provides a service transport channel that can carry unidirectional or bidirectional end-to-end service data of a customer device. The customer device accesses a node (for example, a node 2) on the transport plane by using a user network interface (UNI). The customer device dynamically requests, by using the UNI, to obtain, cancel, and modify an optical bandwidth connection resource with a specific feature. The management plane is a platform used by a network administrator to manage a network, and may be separately connected to the control plane and the transport plane by using a network management interface (NMI), to manage the control plane and the transport plane. The control plane may include one independent network controller, may include a plurality of control plane components, or may include one independent network controller and a plurality of control plane components. The network controller and the control plane component or different control plane components are connected by using a control channel. The control plane and the transport plane are connected by using a connection control interface (CCI). The control plane sends a switching control command to the transport plane by using the CCI, or the transport plane sends resource status information to the control plane by using the CCI.

In an ASON network, the control plane uses an IP-based signaling technology, and introduces the Generalized Multi-Protocol Label Switching (GMPLS) protocol, to implement a distributed connection control management function. In the ASON network, distributed path establishment may be implemented by using the Resource Reservation Protocol-Traffic Engineering (RSVP-TE) used in the GMPLS protocol, to be specific, nodes exchange information hop by hop, to establish a path from a source node to a sink node.

Two types of messages are defined in the RSVP-TE protocol to complete connection management work: a path (Path) message used to initiate a connection establishment or release request and apply for resource reservation, and an acknowledgement (Resv) message used to respond to the request of the path message and complete a resource reservation action on each node. Each message includes a plurality of message objects, and each message object has a specific format and carries specific information.

Figure 3:
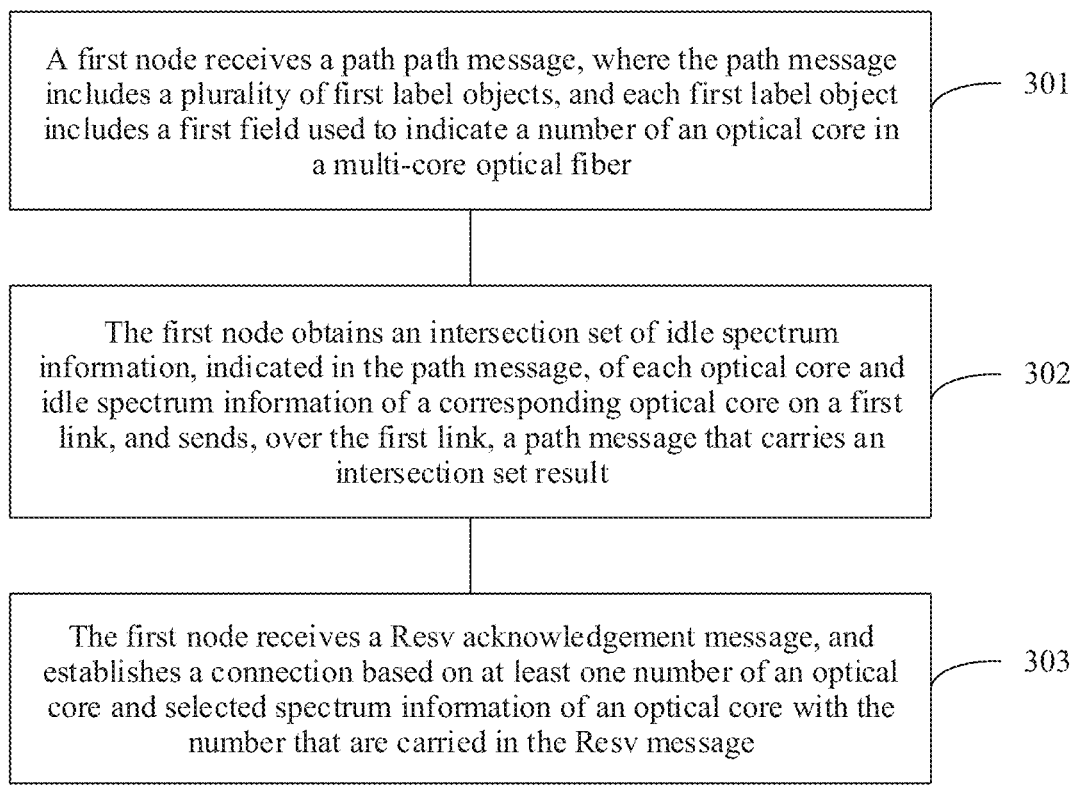
FIG. 3 is a flowchart of a connection establishment method according to an embodiment of this application.

One embodiment provides a connection establishment method for an SDM network. As shown in FIG. 3, the SDM network includes a plurality of nodes, the plurality of nodes are connected to each other by using a multi-core optical fiber, and the method includes the following steps.

301. A first node receives a path message, where the path message includes a plurality of first label objects, and each first label object includes a first field used to indicate a number of an optical core in the multi-core optical fiber.

Figures 4, 5:
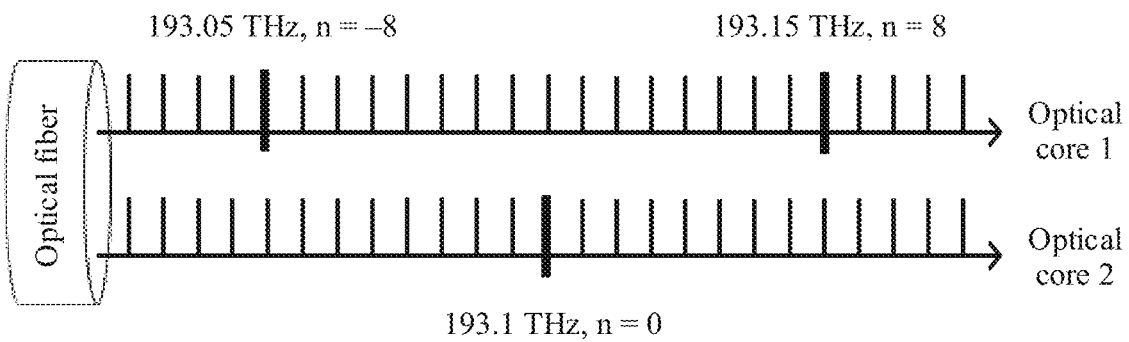
FIG. 4 shows a possible format of a first label object according to an embodiment of this application.
FIG. 5 is a schematic diagram of a spectrum resource of a multi-core optical fiber.

In some embodiments, a possible format of the first label object is shown in FIG. 4, and includes a grid (Grid) field, a spectral interval field, an identifier field, a spectral interval offset field, a spectral width field, the first field, and a reserved field. A different value of the grid field indicates a network to which a live network belongs. For example, when a value of the grid field is 1, it indicates that the live network is a dense wavelength division multiplexing (DWDM) network, and when the value of the grid field is 2, it indicates that the live network is a coarse wavelength division multiplexing (CWDM) network. In accordance with the present disclosure, the grid field may be set to a value to indicate that the live network is the SDM network. In other words, when the value of the grid field is a first value, it indicates that the live network is the SDM network. In some embodiments, a length of the grid field is three bits, and there are definite meanings when the value of the grid field is 0 to 3. Therefore, the first value is a positive integer greater than 3 and less than 8.

Further, the path message is further used to indicate idle spectrum information of each optical core in the multi-core optical fiber. For example, it is assumed that on an optical fiber link, a spectrum resource of each optical core is divided from 193.1 THz to obtain a center frequency, and the center frequency is obtained by stepping towards two sides by 6.25 GHz, in other words, a frequency interval is 6.25 GHz. In an example, the optical fiber includes two optical cores, a spectrum resource on the optical fiber link may be divided as that shown in FIG. 5, and a center frequency of the optical core may be calculated according to the following formula:

$$\text{Frequency (THz)}=193.1 \text{ THz}+(n\times6.25/1000) \text{ (THz)}$$

where n represents a value of the spectral interval offset field. For an optical core 1 or an optical core 2, when n=8, it indicates that the center frequency is 193.15 THz, and when n=−8, it indicates that the center frequency is 193.05 THz.

Each of the plurality of first label objects carries a value n, to indicate that center frequencies corresponding to these values n are all idle center frequencies, and a spectrum of 6.25 GHz on either side of each idle center frequency is idle. Therefore, the idle spectrum information of each optical core may be known. A quantity of first label objects in the path message is equal to a product of a quantity of idle center frequencies of each optical core and a quantity of optical cores.

It should be understood that the foregoing example is merely a manner for representing the idle spectrum information, and an available spectrum resource may alternatively be represented in another manner. For example, for each optical core, only two first label objects are used for representation, a value n in one first label object is used to represent a start frequency of the idle spectrum information, and a value n in the other first label object is used to represent an end frequency of the idle spectrum information. A selected manner for representing the idle spectrum information is not limited in this application.

In some embodiments, in an original label object in the RSVP-TE protocol, a reserved field occupies 16 bits. In the first label object, the first field may occupy a part or all of the reserved field, and therefore a total length of the first field and the reserved field is 16 bits.

302. The first node obtains an intersection set of idle spectrum information, indicated in the path message, of each optical core and idle spectrum information of a corresponding optical core on a first link, and sends, over the first link, a path message that carries an intersection set result.

In some embodiments, each node stores idle spectrum information of all optical cores on an adjacent link. In an example, a network includes only three nodes, a node A is a source node, a node B is an intermediate node, and a node C is a sink node. In this case, the node A stores idle spectrum information of all optical cores on a link between the node A and the node B and on an initial service interface, the node B stores idle spectrum information of all optical cores on the link between the node A and the node B and on a link between the node B and the node C, and the node C stores idle spectrum information of all optical cores on the link between the node B and the node C and on a destination service interface. In this embodiment, the first node is an intermediate node, and the first link is a link between the first node and an adjacent node in a direction from the first node to a second node, in other words, the first link is the link between the node B and the node C.

After step 302, this embodiment of this application further includes the following step:

303. The first node receives a Resv message, and establishes a connection based on at least one number of an optical core and selected spectrum information of an optical core with the number that are carried in the Resv message.

In some embodiments, the selected spectrum information is selected from an intersection set of idle spectrum information of all optical cores on a preset link between a third node and the second node. In this embodiment, the third node is a source node, the second node is a sink node, and the preset link is a path that is pre-calculated or that is obtained by using a network management system and on which the connection is established.

Figure 6:
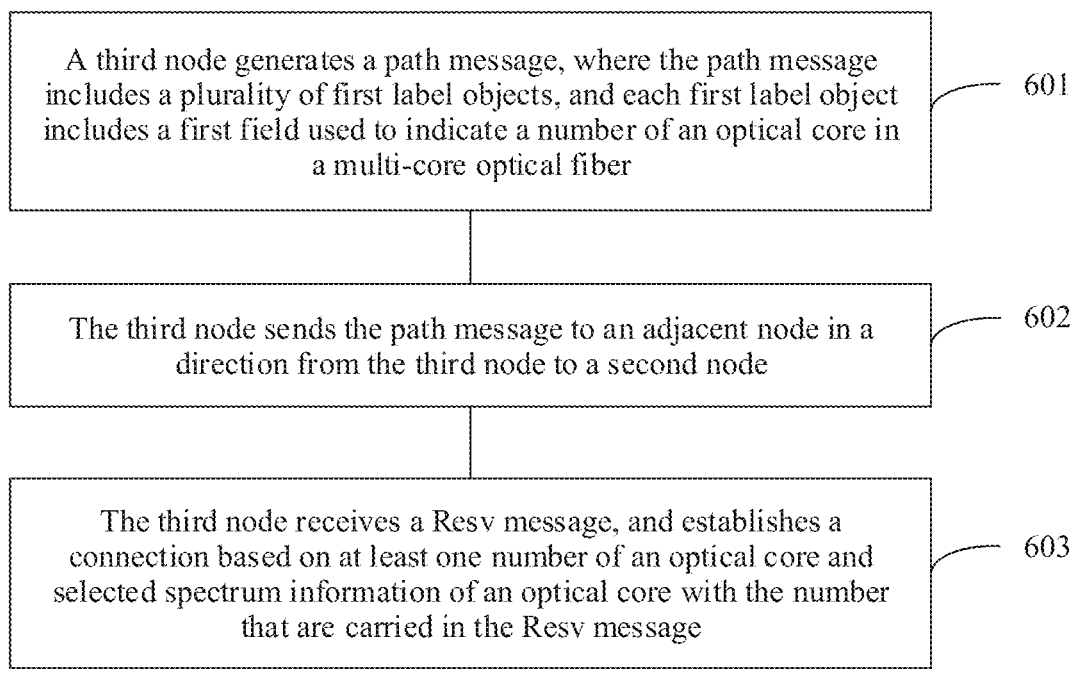
FIG. 6 is a flowchart of a connection establishment method according to another embodiment of this application.

Another embodiment in accordance with the disclosure provides a connection establishment method for an SDM network. As shown in FIG. 6, the SDM network includes a plurality of nodes, the plurality of nodes are connected to each other by using a multi-core optical fiber, and the method includes the following steps.

601. A third node generates a path message, where the path message includes a plurality of first label objects, and each first label object includes a first field used to indicate a number of an optical core in the multi-core optical fiber.

In some embodiments, the path message is further used to indicate idle spectrum information of each optical core in the multi-core optical fiber. The idle spectrum information may be obtained by an intersection set of idle spectrum information of each optical core on a second interface of the third node and idle spectrum information on a second link. The second interface is an interface that receives a service request on the third node, and the second link is a link between the third node and an adjacent node in a direction from the third node to a second node.

In this embodiment, the third node is a source node, the second node is a sink node, and the source node and the sink node may be directly connected, or there may be one or more intermediate nodes.

602. The third node sends the path message to an adjacent node in a direction from the third node to a second node.

603. The third node receives a Resv message, and establishes a connection based on at least one number of an optical core and selected spectrum information of an optical core with the number that are carried in the Resv message.

In some embodiments, the selected spectrum information is selected from an intersection set of idle spectrum information of all optical cores on a preset link between the third node and the second node.

Figure 7:
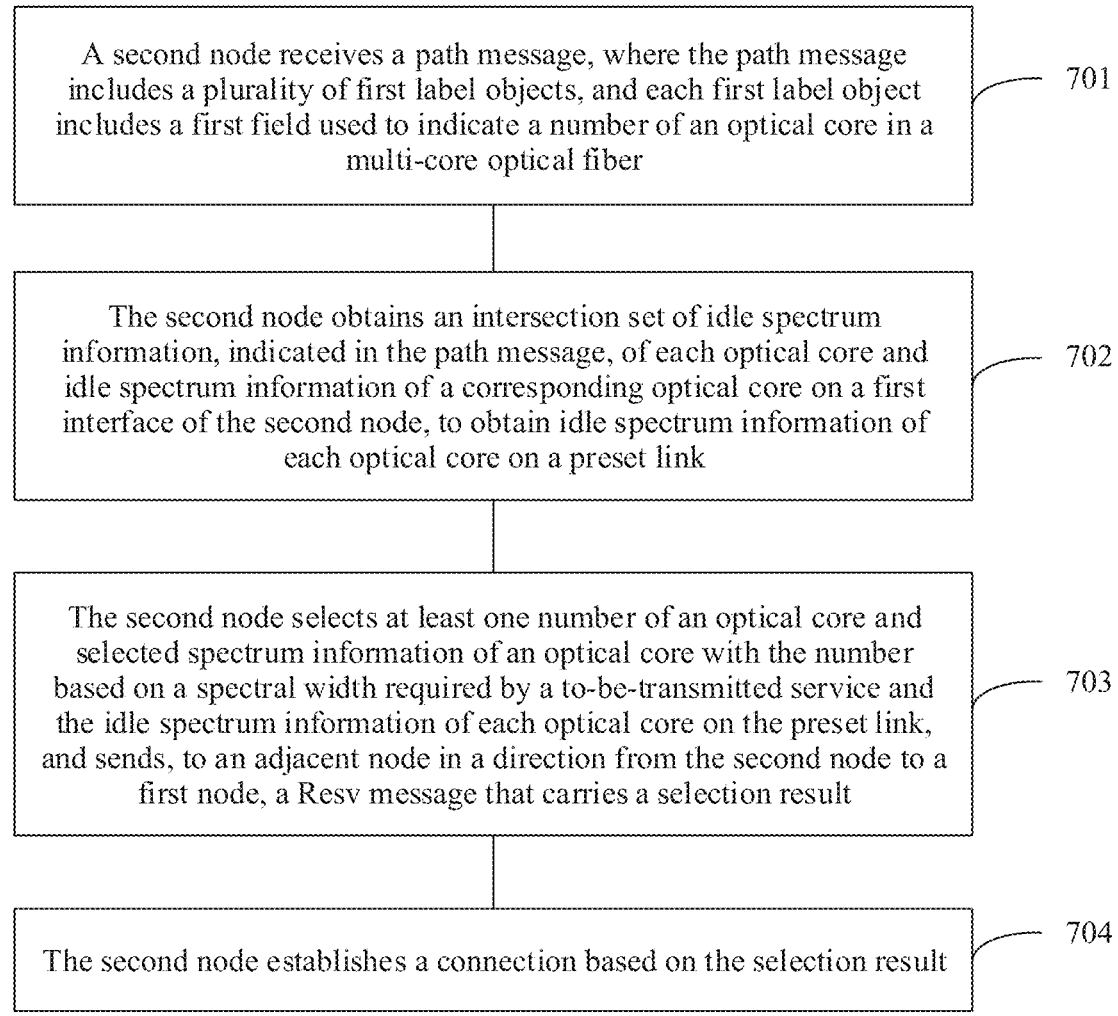
FIG. 7 is a flowchart of a connection establishment method according to another embodiment of this application.

Another embodiment in accordance with the disclosure provides a connection establishment method for an SDM network. As shown in FIG. 7, the SDM network includes a plurality of nodes, the plurality of nodes are connected to each other by using a multi-core optical fiber, and the method includes the following steps.

701. A second node receives a path message, where the path message includes a plurality of first label objects, and each first label object includes a first field used to indicate a number of an optical core in the multi-core optical fiber.

The path message is further used to indicate idle spectrum information of each optical core in the multi-core optical fiber. In this embodiment, the second node is a sink node.

702. The second node obtains an intersection set of idle spectrum information, indicated in the path message, of each optical core and idle spectrum information of a corresponding optical core on a first interface of the second node, to obtain idle spectrum information of each optical core on a preset link.

The first interface is a destination interface on the preset link.

703. The second node selects at least one number of an optical core and selected spectrum information of an optical core with the number based on a spectral width required by a to-be-transmitted service and the idle spectrum information of each optical core on the preset link, and sends, to an adjacent node in a direction from the second node to a first node, a Resv message that carries a selection result.

In some embodiments, it may be assumed that a plurality of optical cores have idle spectrum information. If idle spectrum information of an optical core is greater than the spectral width required by the to-be-transmitted service, an idle spectrum only of the optical core may be selected, or a part of an idle spectrum may be selected from the optical core, and the other part may be selected from another optical core. If idle spectrum information of none of the optical cores is greater than the spectral width required by the to-be-transmitted service, a part of an idle spectrum is selected from each of the plurality of optical cores for splicing, and if a sum of idle spectrum information of the plurality of optical cores is less than the spectral width required by the to-be-transmitted service, a connection fails to establish.

It should be noted that, the spectral width required by the to-be-transmitted service may be carried in a traffic parameter object stipulated in the RSVP-TE protocol, and the traffic parameter object may be carried in the path message together with the first label object.

704. The second node establishes a connection based on the selection result.

Figure 8:
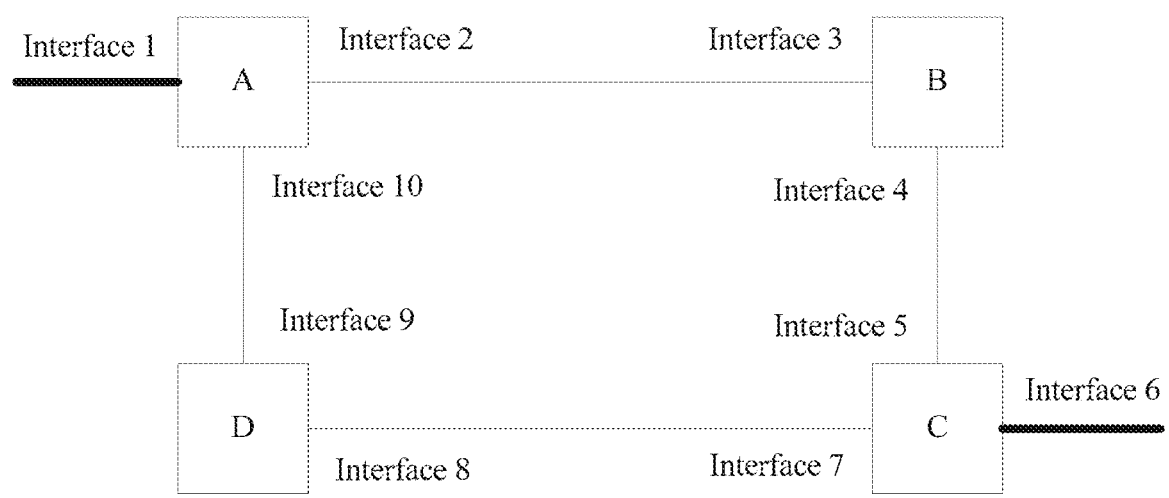
FIG. 8 is a structural diagram of an SDM network.

Various solutions in accordance with the present disclosure are described below by using one embodiment. A simple SDM network is shown in FIG. 8, and includes four nodes A, B, C, and D, and a line between the nodes represents a multi-core optical fiber link. An interface 1 represents a signal input and output interface of the node A, and an interface 6 represents a signal input and output interface of the node C. "Input" means receiving a signal by a signal transmit end that is usually one or more lasers, and "output" means transmitting a signal by a signal receive end that is usually one or more receivers. The interface 1/interface 6 may input and output a signal, in other words, the interface 1/interface 6 may send and receive signals in a plurality of optical cores in an optical fiber.

It is assumed that a network management system or a client instructs the node A to establish a connection between the interface 1 of the node A and the interface 6 of the node C in FIG. 8, and a spectrum bandwidth requirement is 25 GHz. If the node A obtains a route (A, B, C), namely, (interface 1, interface 2, interface 3, interface 4, interface 5, interface 6), of the connection through calculation or by using the network management system, the node A is a source node, the node B is an intermediate node, and the node C is a sink node. The method specifically includes the following steps.

(1) The node A obtains idle spectrum information of each optical core on the interface 1 of the node and idle spectrum information of each optical core on a link AB, and sends a path message to a next node (the node B) on a path, where the path message includes a plurality of first label objects.

The path message is further used to indicate idle spectrum information of each optical core in a multi-core optical fiber. The idle spectrum information of each optical core may be specifically obtained by an intersection set of the idle spectrum information of each optical core on the interface 1 and the idle spectrum information of each optical core on the link AB. An optical fiber with two cores is used as an example. It is assumed that information carried in the path message is {n1, n2, n3} of a core 1 and {n0, n1, n2, n3, n4, n5, n6} of a core 2, as shown in FIG. 9(a).

It should be noted that the idle spectrum information may be represented in a plurality of manners. A manner for representing the idle spectrum information is not limited in this application provided that spectrum information that may be selected can be represented. In this embodiment, {n1, n2, n3} indicates that spectrum information from a center frequncy n1 to a center frequncy n3 is idle spectrum information.

(2) The node B receives the path message, and determines, based on the idle spectrum information, of each optical core that is carried in the path message and with reference to idle spectrum information of each local optical core (namely, each optical core on a link BC), information that should be carried in a path message destined for the node C.

Figure 9A:
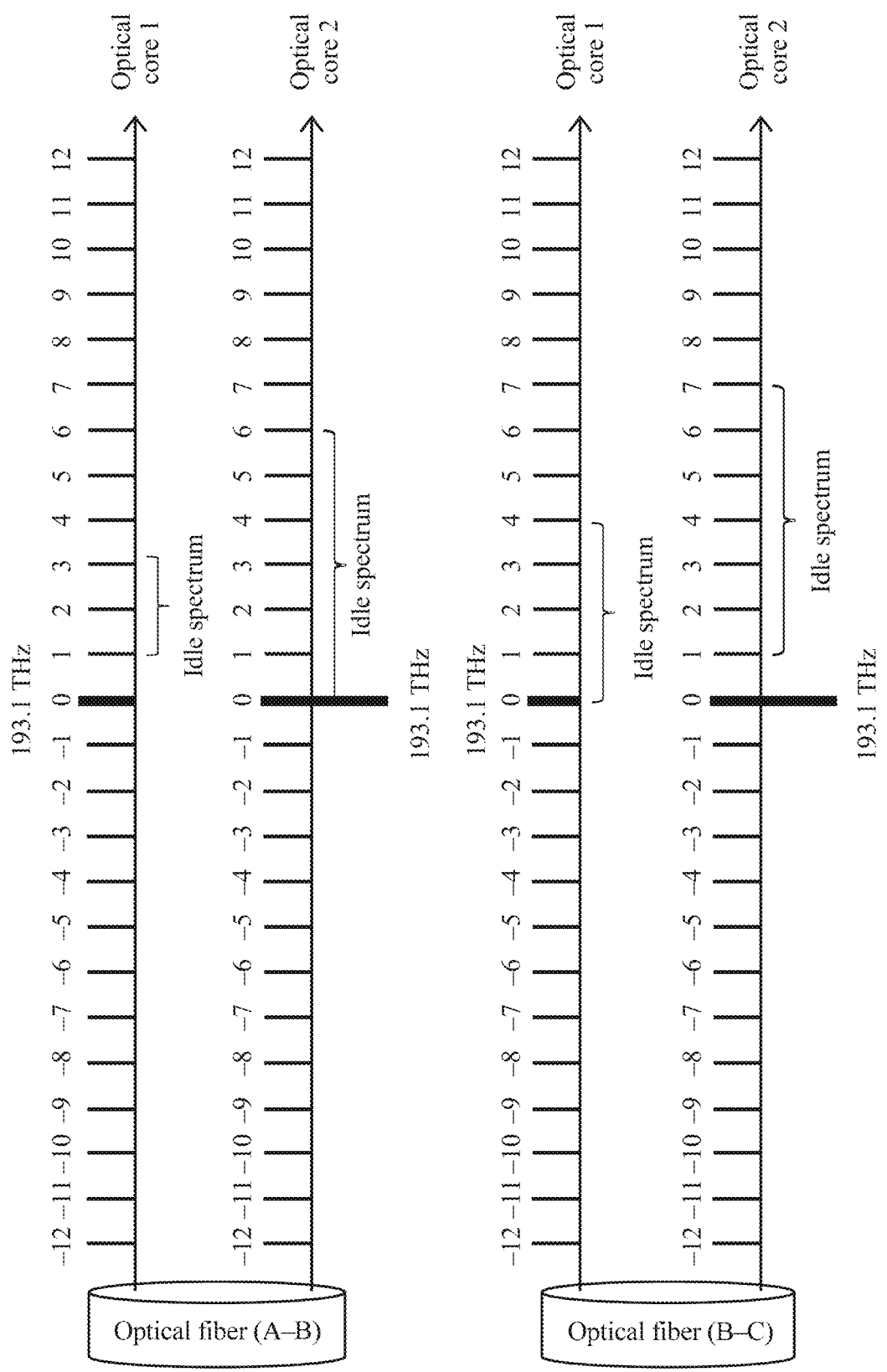
FIG. 9(a) is a schematic diagram of idle spectrum resources of a multi-core optical fiber between different nodes.

As shown in FIG. 9(a), the idle spectrum information on the link BC is {n0, n1, n2, n3, n4} of a core 1 and {n1, n2, n3, n4, n5, n6, n7} of a core 2. Idle spectrum information, namely, {n1, n2, n3} of a core 1 and {n1, n2, n3, n4, n5, n6} of a core 2, that should be carried in the path message destined for the node C is obtained by an intersection set of the idle spectrum information on the link BC and the idle spectrum information of each optical core that is carried in the received path message.

(3) The node C is the sink node of the connection, and after receiving the path message sent by the node B, the node C first obtains an intersection set of idle spectrum information of each optical core on the interface 6 and the idle spectrum information carried in the path message, and then selects, based on bandwidth required by a to-be-transmitted service, spectrum resource information used for establishing the connection.

It is assumed that the idle spectrum information on the interface 6 includes the idle spectrum information carried in the path message. In the two optical cores, the optical core 1 has an idle spectrum of 12.5 GHz, and the optical core 2 has an idle spectrum of 31.25 GHz. A total spectrum of 25 GHz is selected from the idle spectrums of the two optical cores. A selection manner is not limited in this application. After selection, a frequency band is configured for a receive end on the interface 6, and the connection is established. In other words, the frequency band is used to establish a connection between the interface 5 and the receive end on the interface 6.

The node C further sends, to the node B, a Resv message that carries the selected spectrum information. Optionally, the selected spectrum information may be carried in the following manner: Assuming that the node C selects an idle spectrum of 12.5 GHz from the optical core 1 and an idle spectrum of 12.5 GHz from the frequency n1 to the frequency n3 from the optical core 2, the selected spectrum information may be carried in a first label object, for example, core=1, n=2, and m=1; and core=2, n=2, and m=1, where the core represents a first field, core=1 represents the optical core 1 in the optical fiber, n represents a spectral interval offset field, n=2 means that a center frequency is 193.1 THz+(2×6.25/1000)=193.1125 THz, m represents a spectral width field, and m=1 means that a spectrum of 6.25 GHz is occupied on either side of the center frequency. The first label object is carried in the Resv message.

(4) The node B receives the Resv message, obtains, based on the spectrum information that is carried in the Resv message and that is selected by the node C, a spectrum resource that needs to be allocated by the node B to each optical core on the interface 4, and establishes a connection. In other words, a corresponding frequency band allocated is used to establish a connection between the interface 3 and the interface 4.

The node B sends the Resv message to a previous node (the node A) on the path. The Resv message carries the spectrum resource information, namely, core=1, n=2, and m=1; and core=2, n=2, and m=1, of each optical core, selected by the node C for this connection.

(5) The node A receives the Resv message, and obtains, based on the selected spectrum information carried in the Resv message, a spectrum resource that needs to be allocated by the node A to each optical core on the interface 2. The interface 1 is an add/drop wavelength interface, and therefore a laser at a transmit end connected to the interface 1 needs to be adjusted to the foregoing frequency band, and a connection is established. In other words, a corresponding frequency band is used to establish a connection between the interface 1 and the interface 2.

Figure 9B:
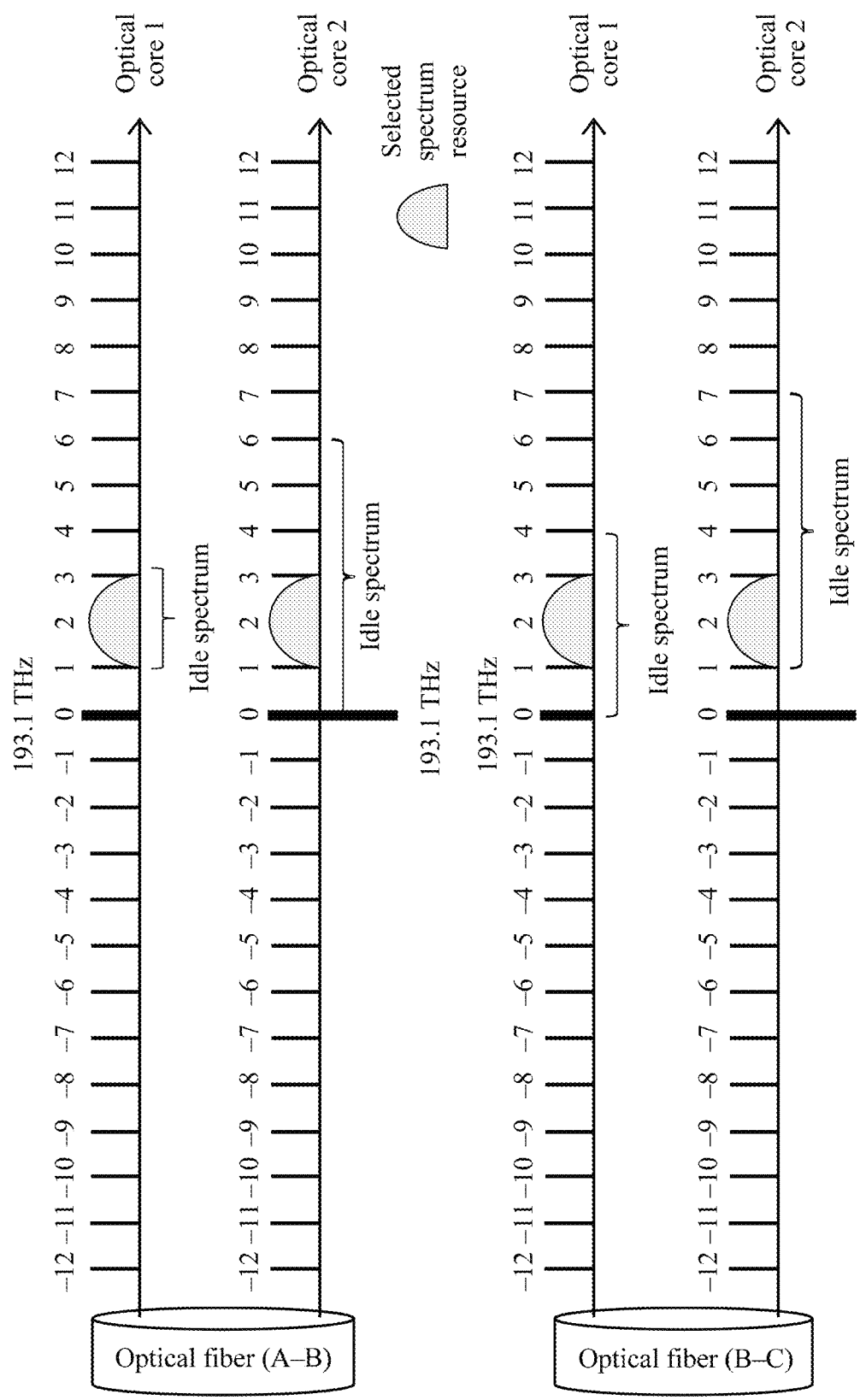
FIG. 9(b) is a schematic diagram of actually allocated spectrum resources of a multi-core optical fiber between different nodes.

The node A is a source node of the wavelength connection, and establishment of the connection is completed. In this embodiment, an idle spectrum resource of each optical core on each link and a spectrum resource actually used by the service are shown in FIG. 9(b).

In an solution provided in this embodiment, an SDM network based on a multi-core optical fiber can be supported, a connection of variable spectrum bandwidth of a node can be automatically established, implementation is simple, and reliability is high.

In addition, spectrum resource information of an adjacent link that is stored by each node is obtained by each node by transmitting resource information to an adjacent node by using the Open Shortest Path First-Traffic Engineering (OSPF-TE) protocol. However, an existing spectrum resource information transmission method cannot satisfy a requirement of the SDM network.

Figure 10:
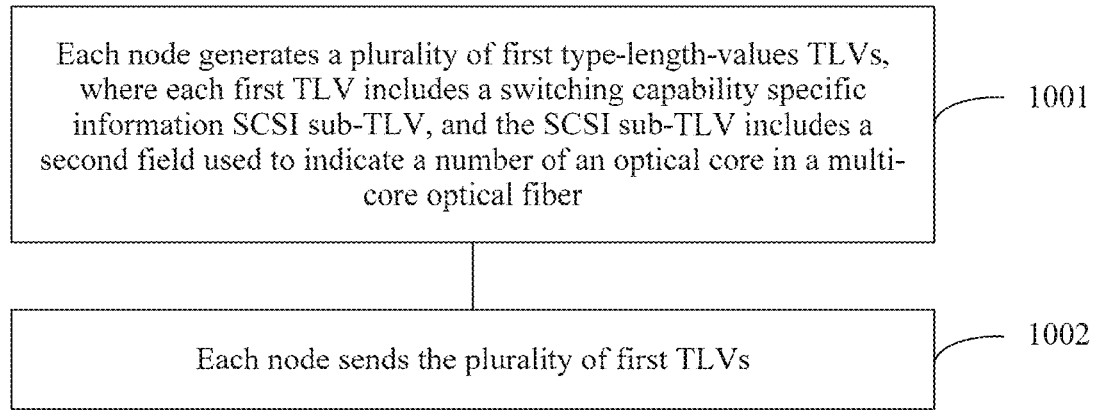
FIG. 10 shows a resource information transmission method according to another embodiment of this application.

Embodiments provide a resource information transmission method for an SDM network. The SDM network includes a plurality of nodes, and different nodes are connected to each other by using a multi-core optical fiber. As shown in FIG. 10, the method includes the following steps.

1001. Each node generates a plurality of first type-length-values (TLV), where each first TLV includes a switching capability specific information (SCSI) sub-TLV, and the SCSI sub-TLV includes a second field used to indicate a number of an optical core in the multi-core optical fiber.

A network is dynamic, and therefore in terms of a spectrum resource, an available spectrum resource also continuously changes with a service change or addition or removal of a service. In the OSPF-TE protocol, this change may be dynamically updated to each node, a controller, or another network device by using the SCSI sub-TLV, to reflect a latest network resource status. For example, it may be set that updating is performed at intervals.

Figure 11:
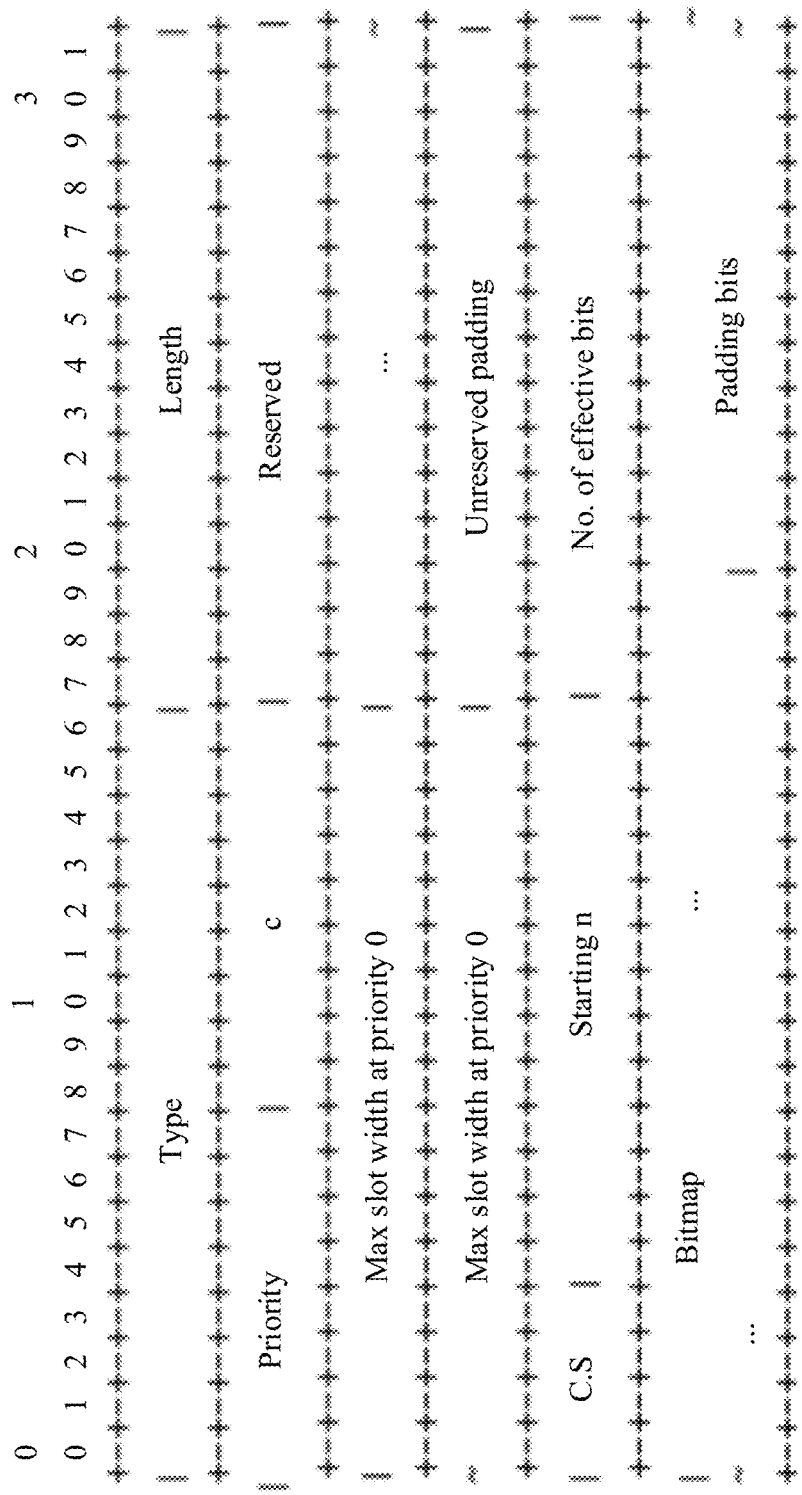
FIG. 11 shows a possible format of a SCSI sub-TLV according to another embodiment of this application.

In some embodiments, a possible format of the SCSI sub-TLV is shown in FIG. 11. The SCSI sub-TLV further includes a No. of effective bits (No. of Effective Bits) field, a bitmap (Bitmap) field, and the like, where the No. of effective bits field is used to indicate a quantity of effective center frequencies of an optical core c, the bitmap field is used to indicate an idle center frequency, and c in FIG. 11 represents a value of the second field.

In some embodiments, a quantity of first TLVs sent by each node is the same as a quantity of optical cores in the multi-core optical fiber.

1002. Each node sends the plurality of first TLVs.

In some embodiments, the first TLV further includes a switching capability (SC) field. When the SC field is a second value, the SC field is used to indicate that a live network is the SDM network. The second value is different from a value that has been designated for the SC field and that has a specific meaning. When the SC field is equal to 1 to 4, 51, 100, 150, and 200, the SC field has definite meanings. Therefore, the second value cannot be the eight values. Optionally, a length of the SC field is eight bits. Therefore, the second value cannot be greater than 255.

In comparison with spectrum resource information that dynamically changes, that is of an SDM optical core, and that is expressed in the SCSI sub-TLV, another type of characteristic used to indicate a static feature of an optical core needs to be expressed. For example, another type of characteristic is used to indicate information such as a quantity of optical cores in an optical fiber, a location of each optical core, and a supported type (for example, a Flex Grid or a Fix Grid). These characteristics generally remain unchanged, and therefore these characteristics are referred to as static features.

Figure 12:
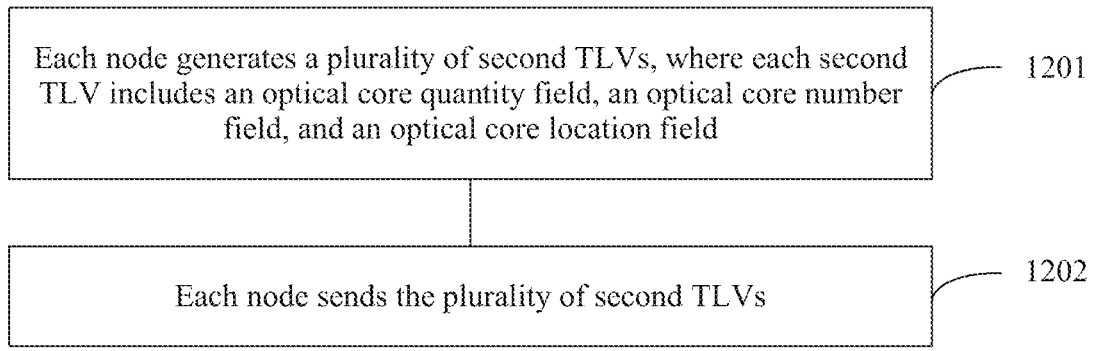
FIG. 12 shows a resource information transmission method according to another embodiment of this application.

For these static features, the present disclosure provides another resource information transmission method for an SDM network. As shown in FIG. 12, the method includes the following steps.

1201. Each node generates a plurality of second TLVs, where each second TLV includes an optical core quantity field, an optical core number field, and an optical core location field.

In some embodiments, the optical core quantity field is used to indicate a total quantity of optical cores in a multi-core optical fiber in the SDM network, the optical core number field is used to indicate a number of an optical core indicated in the second TLV, and the optical core location field is used to indicate a location of the optical core in the multi-core optical fiber. In some embodiments, the location of the optical core in the multi-core optical fiber may be represented by using two-dimensional coordinates information.

Figure 13:
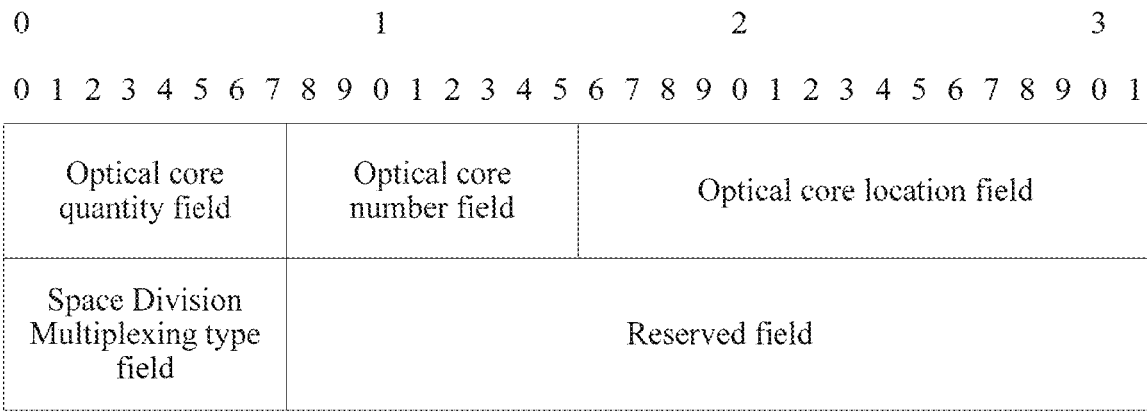
FIG. 13 shows a possible format of a second TLV according to another embodiment of this application.

In some embodiments, the second TLV further includes an SDM type field. The SDM type field is used to indicate that a frequency band division type of a live network is a flex grid or a fix grid. A possible format of the second TLV is shown in FIG. 13.

1202. Each node sends the plurality of second TLVs.

In some embodiments, a quantity of second TLVs sent by each node is the same as a quantity of optical cores in the multi-core optical fiber.

Figure 14:
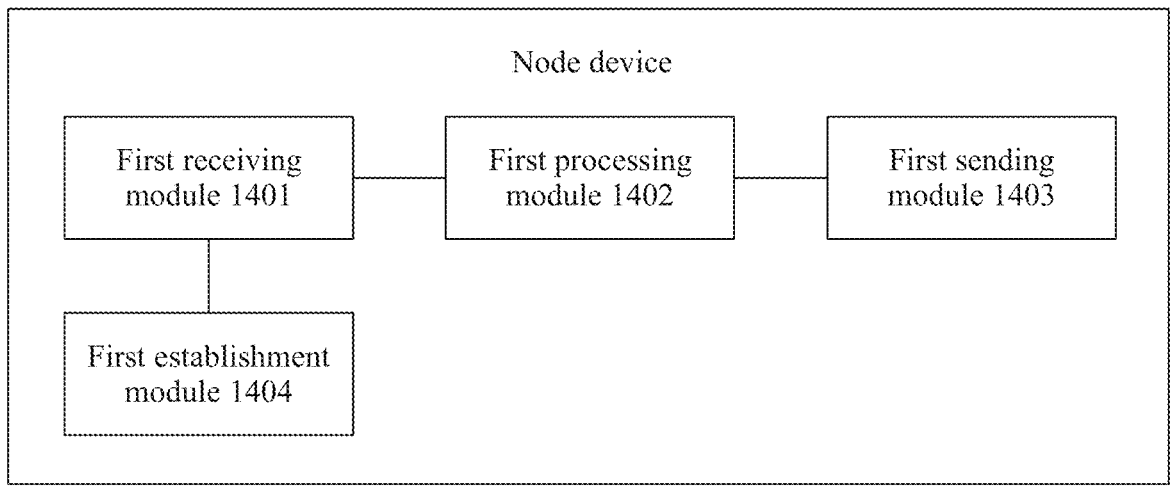
FIG. 14 shows a node device according to another embodiment of this application.

Another embodiment further provides a node device. The node device is used for an SDM network, and is an intermediate node device, and different node devices are connected to each other by using a multi-core optical fiber. A structure of the node device is shown in FIG. 14, and includes a first receiving module 1401, a first processing module 1402, and a first sending module 1403.

The first receiving module 1401 is configured to: receive a path message, and send the path message to the first processing module 1402.

The path message is used to indicate idle spectrum information of each optical core in the multi-core optical fiber, and the path message includes a plurality of first label objects. Each first label object includes a first field used to indicate a number of an optical core in the multi-core optical fiber, and a possible format of the first label object is shown in FIG. 4.

The first processing module 1402 is configured to obtain an intersection set of the idle spectrum information, indicated in the path message, of each optical core and idle spectrum information of a corresponding optical core on a first link.

In some embodiments, the first link is a link between the node and an adjacent node in a direction from the node to a sink node.

The first sending module 1403 is configured to send, over the first link, a path message that carries an intersection set result.

Further, the node device further includes a first establishment module 1404.

The first receiving module 1401 is further configured to: receive an acknowledgement (Resv) message, and send the Resv message to the first establishment module 1404.

The first establishment module 1404 is configured to establish a connection based on at least one number of an optical core and selected spectrum information of an optical core with the number that are carried in the Resv message.

The selected spectrum information is selected from an intersection set of idle spectrum information of all optical cores on a preset link between the source node and the sink node. The preset link is a path that is pre-calculated or that is obtained by using a network management system and on which the connection is established.

In some embodiments, the first label object further includes a grid field. When the grid field is a first value, the grid field is used to indicate that a live network is the SDM network, and the first value is a positive integer greater than 3 and less than 8.

In some embodiments, the first label object further includes a reserved field. A total length of the first field and the reserved field is 16 bits.

Figure 15:
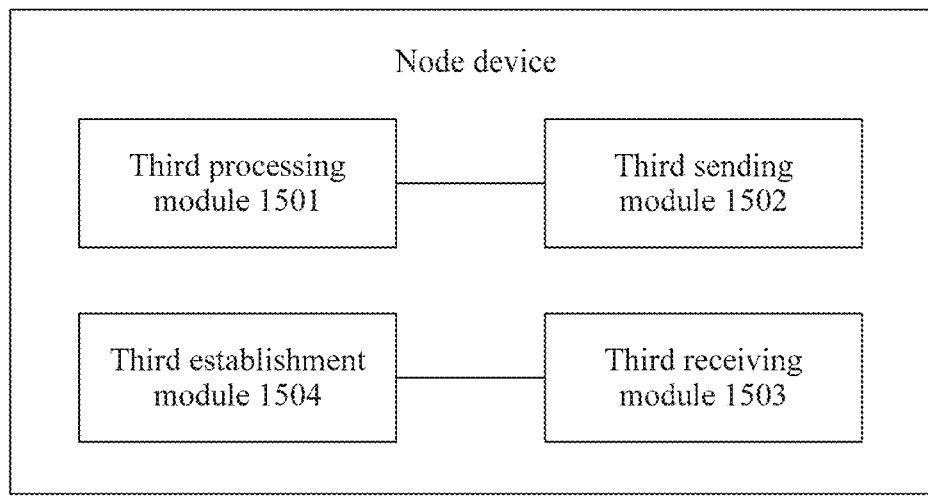
FIG. 15 shows a node device according to another embodiment of this application.

Another embodiment further provides a node device that is a source node device. A structure of the node device is shown in FIG. 15, and includes a third processing module 1501 and a third sending module 1502.

The third processing module 1501 is configured to: generate a path message, and send the path message to the third sending module 1502.

In some embodiments, the path message includes a plurality of first label objects, each first label object includes a first field used to indicate a number of an optical core in a multi-core optical fiber, and the path message is further used to indicate idle spectrum information of each optical core in the multi-core optical fiber.

The third sending module 1502 is configured to send the path message to an adjacent node in a direction from the node to a sink node.

Further, the node device further includes a third receiving module 1503 and a third establishment module 1504.

The third receiving module 1503 is configured to: receive a Resv message, and send the Resv message to the third establishment module 1504.

The third establishment module 1504 is configured to establish a connection based on at least one number of an optical core and selected spectrum information of an optical core with the number that are carried in the Resv message.

The selected spectrum information is selected from an intersection set of idle spectrum information of all optical cores on a preset link between a source node and the sink node. The preset link is a path that is pre-calculated or that is obtained by using a network management system and on which the connection is established.

Figure 16:
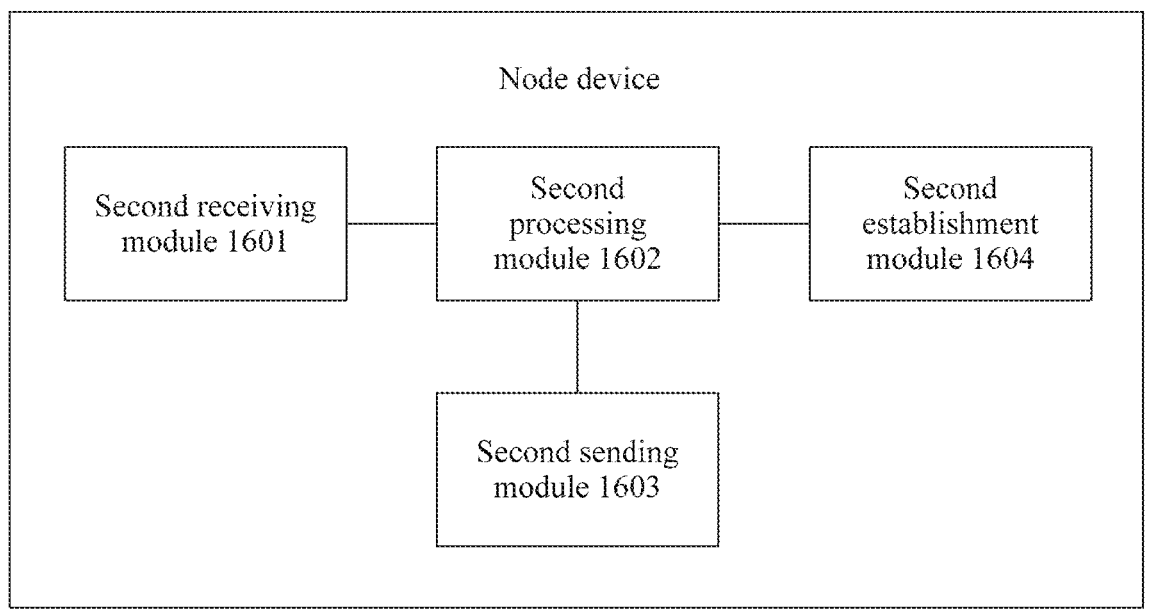
FIG. 16 shows a node device according to another embodiment of this application.

Another embodiment further provides a node device that is a sink node device. A structure of the node device is shown in FIG. 16, and includes a second receiving module 1601, a second processing module 1602, a second sending module 1603, and a second establishment module 1604.

The second receiving module 1601 is configured to: receive a path message, and send the path message to the second processing module 1602.

In some embodiments, the path message includes a plurality of first label objects, each first label object includes a first field used to indicate a number of an optical core in a multi-core optical fiber, and the path message is further used to indicate idle spectrum information of each optical core in the multi-core optical fiber.

The second processing module 1602 is configured to obtain an intersection set of the idle spectrum information, indicated in the path message, of each optical core and idle spectrum information of a corresponding optical core on a first interface of the node, to obtain idle spectrum information of each optical core on a preset link, where the first interface is a destination interface on the preset link; and is further configured to: select at least one number of an optical core and selected spectrum information of an optical core with the number based on a spectral width required by a to-be-transmitted service and the idle spectrum information of each optical core on the preset link, and send a selection result to the second sending module 1603 and the second establishment module 1604.

In some embodiments, the spectral width required by the to-be-transmitted service may be carried in a traffic parameter object. The traffic parameter object is carried in the path message together with the first label object.

The second sending module 1603 is configured to send, to an adjacent node in a direction from the node to a source node, a Resv message that carries the selection result.

The second establishment module 1604 is configured to establish a connection based on the selection result.

Another embodiment further provides a connection establishment system. The system includes at least a first node, a second node, and a third node. Different nodes are connected to each other by using a multi-core optical fiber. The first node is the node device shown in FIG. 14, the second node is the node device shown in FIG. 16, and the third node is the node device shown in FIG. 15.

The connection establishment system provided in this application can support an SDM network that is based on a multi-core optical fiber, a connection of variable spectrum bandwidth of a node can be automatically established, implementation is simple, and reliability is high.

Another embodiment provides a computer readable storage medium. The computer readable storage medium stores a computer execution instruction. When at least one processor of a device executes the computer execution instruction, the device performs the connection establishment method provided in the embodiment shown in any one of FIG. 3, FIG. 6, and FIG. 7.

Another embodiment provides a computer program product. The computer program product includes a computer execution instruction, and the computer execution instruction is stored in a computer readable storage medium. At least one processor of a device may read the computer execution instruction from the computer readable storage medium, and when the at least one processor executes the computer execution instruction, the device performs the connection establishment method provided in the embodiment shown in any one of FIG. 3, FIG. 6, and FIG. 7.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A node device, wherein the node device is used for a Space Division Multiplexing (SDM) network, different node devices are connected to each other by using a multi-core optical fiber, and the node device comprises:
    a computing hardware; and
    a non-transitory computer-readable storage medium including computer-executable instructions executed by the computing hardware to cause the computing hardware to perform:
    receiving a path message, wherein the path message comprises a plurality of first label objects, each first label object comprising a first field indicating a number of an optical core in the multi-core optical fiber, wherein the path message further indicates idle spectrum information of each optical core in the multi-core optical fiber;
    obtaining an intersection set of the idle spectrum information, indicated in the path message, of each optical core and idle spectrum information of a corresponding optical core on a first link, wherein the first link is a link between the node device and an adjacent node in a direction from the node device to a sink node; and
    sending, over the first link, a path message that carries an intersection set result.

2. The device according to claim 1, wherein the computer hardware is further caused to perform:
    receiving an acknowledgement message, and
    establishing a connection based on at least one number of an optical core and selected spectrum information of an optical core identified by the acknowledgement message, wherein the selected spectrum information is selected from an intersection set of idle spectrum information of all optical cores on a preset link between a source node and the sink node.

3. The device according to claim 1, wherein a quantity of first label objects in the path message is not less than a quantity of optical cores in the multi-core optical fiber.

4. The device according to claim 1, wherein the first label object further comprises a grid field, wherein a first value of the grid field indicates that a live network is the SDM network, and the first value is a positive integer greater than 3 and less than 8.

5. The device according to claim 1, wherein the first label object further comprises a reserved field, and a total length of the first field and the reserved field is 16 bits.

6. A node device, wherein the node device is used for a Space Division Multiplexing (SDM) network, different node devices are connected to each other by using a multi-core optical fiber, and the node device comprises:
    a computing hardware; and a non-transitory computer-readable storage medium including computer-executable instructions executed by the computing hardware to perform operations that comprising:

generating a path message, wherein the path message comprises a plurality of first label objects, each first label object comprising a first field indicating a number of an optical core in the multi-core optical fiber, wherein the path message further indicates idle spectrum information of each optical core in the multi-core optical fiber; and sending the path message to an adjacent node in a direction from the node device to a sink node.

7. The device according to claim 6, wherein the operations further comprises:

receiving an acknowledgement message, and establishing a connection based on at least one optical core and selected spectrum information of an optical core having the number that are carried in the acknowledgement message, wherein the selected spectrum information is selected from an intersection set of idle spectrum information of all optical cores on a preset link between a source node and the sink node.

8. The device according to claim 6, wherein a quantity of first label objects comprised in the path message is not less than a quantity of optical cores in the multi-core optical fiber.

9. The device according to claim 6, wherein the first label object further comprises a grid field, wherein a first value of the grid field indicates that a live network is the SDM network, and the first value is a positive integer greater than 3 and less than 8.

10. The device according to claim 6, wherein the first label object further comprises a reserved field, and a total length of the first field and the reserved field is 16 bits.

11. A connection establishment system for a Space Division Multiplexing (SDM) network, wherein the system comprises a first node device and a second node device, and the first and second node devices are connected to each other by using a multi-core optical fiber:

the first node device is configured to generate a path message, wherein the path message comprises a plurality of first label objects, each first label object comprising a first field indicating a number of an optical core in the multi-core optical fiber, wherein the path message further indicates idle spectrum information of each optical core in the multi-core optical fiber; and the first node device is configured to send the path message to the second node device, wherein the second node device is an adjacent node in a direction from the first node device to a sink node.

12. The system according to claim 11, wherein the second node device is configure to:

receive the path message;

obtain an intersection set of the idle spectrum information, indicated in the path message, of each optical core and idle spectrum information of a corresponding optical core on a first link, wherein the first link is a link between the second node device and an adjacent node in a direction from the second node device to the sink node; and send, over the first link, a path message that carries an intersection set result.

13. The system according to claim 11, wherein the first node device is further configured to:

receive an acknowledgement message, and establish a connection based on at least one optical core and selected spectrum information of an optical core with the number that are carried in the acknowledgement message, wherein the selected spectrum information is selected from an intersection set of idle spectrum information of all optical cores on a preset link between a source node and the sink node.

14. The system according to claim 11, wherein a quantity of first label objects comprised in the path message is not less than a quantity of optical cores in the multi-core optical fiber.

15. The system according to claim 11, wherein the first label object further comprises a grid field, wherein a first value of the grid field indicates a live network is the SDM network, and the first value is a positive integer greater than 3 and less than 8.

16. The system according to claim 11, wherein the first label object further comprises a reserved field, and a total length of the first field and the reserved field is 16 bits.

* * * * *